United States Patent [19]

Ishikuma et al.

[11] Patent Number: 4,708,881

[45] Date of Patent: Nov. 24, 1987

[54] METHOD FOR PRODUCING FROZEN FOODS

[75] Inventors: Mineyasu Ishikuma, Kanagawa; Hiroshi Hasui, Takamatsu; Toshiyuki Ono, Kagawa, all of Japan

[73] Assignee: Ajinomoto Co., Inc., Tokyo, Japan

[21] Appl. No.: 826,904

[22] Filed: Feb. 6, 1986

[30] Foreign Application Priority Data

Feb. 13, 1985 [JP] Japan ............................. 24409/1985

[51] Int. Cl.$^4$ ................................................ A23L 3/36
[52] U.S. Cl. ...................................... 426/524; 426/293
[58] Field of Search ....................... 426/524, 293, 393; 62/66, 68

[56] References Cited

U.S. PATENT DOCUMENTS 3,009,814 11/1961 Rivoche ............................. 426/524

Primary Examiner—George Yeung
Attorney, Agent, or Firm—Oblon, Fisher, Spivak, McClelland & Maier

[57] ABSTRACT

An improved method of producing frozen food including at least two steps of freezing. Food is frozen at a temperature in the neighborhood of a temperature at which the maximum crystallization of ice takes place. Then, the food is processed, and frozen again at a temperature which is not higher than $-10°$ C.

4 Claims, 3 Drawing Figures

METHOD FOR PRODUCING FROZEN FOODS

BACKGROUND OF THE INVENTION

1. Field of the Invention:

This invention relates to a method of producing frozen food which requires at least two steps of freezing. It is applicable to the food which is a liquid or semifluid at normal room temperature, such as a cream croquette or decorated ice cream.

2. Description of the Prior Art:

The frozen food of the type to which this invention is applicable has hitherto been produced by a gyrofreezer of the type as disclosed in Japanese Utility Model Publication No. 28805/1982 and shown in FIG. 3, or a tunnel freezer. The gyrofreezer shown in FIG. 3 comprises a drum 1 and two chain belts 2a and 2b which are wound about the drum 1 spirally and in parallel to each other. Each of the belts has an inlet end and an outlet end which are connected to the outlet and inlet ends, respectively, of the other belt, so that they may form an endless belt. The food to be frozen is fed to the endless belt at the bottom thereof and the frozen food is removed therefrom at the top thereof. Both of the former and latter steps of freezing have hitherto been performed at a substantially equal temperature of $-10°$ C. to $-18°$ C.

The production of frozen food in a conventional way as hereinabove described has, however, a number of problems. It requires a great deal of time. When a frozen croquette is, for example, produced, the intermediate product made by the first step of freezing must be separated from a tray and coated by battering or breading, but is difficult to separate from the tray. Moreover, the material with which it must be coated fails to adhere to it satisfactorily.

SUMMARY OF THE INVENTION

It is an object of this invention to provide a method of producing frozen food which can overcome the problems as hereinabove pointed out.

This object is attained by a method including at least two steps of freezing, and characterized by freezing food at a temperature in the neighborhood of a temperature at which the formation of ice crystals takes place to a maximum extent, subjecting the frozen food to intermediate or final processing, and freezing the processed food at a temperature not exceeding $-10°$ C.

According to this invention, food is removed from a freezer for intermediate or final processing when it is in the neighborhood of the temperature at which the crystallization of ice takes place to a maximum extent. This enables a reduction in the cost of energy and an improvement in working efficiency without exerting may adverse effect on the physical or other properties of the food. If the food is removed from the freezer for processing at a higher temperature, e.g., $3°$ C., its temperature rises easily, resulting in a number of problems including the likelihood that it may easily lose its desired shape, or be contaminated by microorganisms. If the food is, on the other hand, cooled to a temperature which is lower than $-5°$ C., it is impossible to obtain the results which are expected from this invention, since cooling to such a low temperature gives rise to an increase in the cost of energy and a lowering in working efficiency.

The method of this invention can be carried out by a single freezer. Therefore, it enables a reduction in the cost of equipment for the production of frozen food, the space and energy required therefor, and the effective arrangement of a transportation line.

DETAILED DESCRIPTION OF THE INVENTION

The method of this invention is applicable to the production of, for example, frozen cream croquettes. Cream is formed into a desired shape, such as a short columnar shape, and frozen, and the frozen cream is coated and frozen again, whereby a frozen cream croquette is produced.

According to an important aspect of this invention, th cream is frozen at a temperature in the neighborhood of a temperature at which the crystallization of ice takes place to a maximum extent. More specifically, it is frozen at a temperature between about $0°$ C. and about $-5°$ C., and preferably, between about $-3°$ C. and $-5°$ C. The frozen cream is coated and the coated product is subjected to final freezing at a temperature which is not higher than $-10°$ C., and preferably, not higher than $-18°$ C.

The temperature at which the crystallization of ice takes place to a maximum extent is the temperature which causes the food to become substantially completely frozen. If the food contains a large amount of water, the term means the temperature at which about 80% of the water forms ice. The temperature has a certain range. It is usually between $-1°$ C. and $-5°$ C. The majority of food forms ice if it is cooled to such a temperature. The energy required for such cooling is consumed at the latent heat of freezing and does not, therefore, bring about any substantial drop in temperature.

The intermediate or final processing of the frozen food is not limited to the addition of something thereto, such as the coating of the cream for croquettes, but also includes other methods of processing, such as heating and frying.

The final step of freezing is carried out at a temperature which is not higher than $-10°$ C., and preferably not higher than $-18°$ C.

The method of this invention can be carried out by using any type of freezer that is usually employed for the production of frozen food, such as a gyrofreezer or tunnel freezer. Although it is possible to use two freezers for the first and final steps, respectively, of freezing which are performed under different conditions, it is sufficient to use a single freezer if the production of frozen food is carried out on a batch basis.

Figure 1:
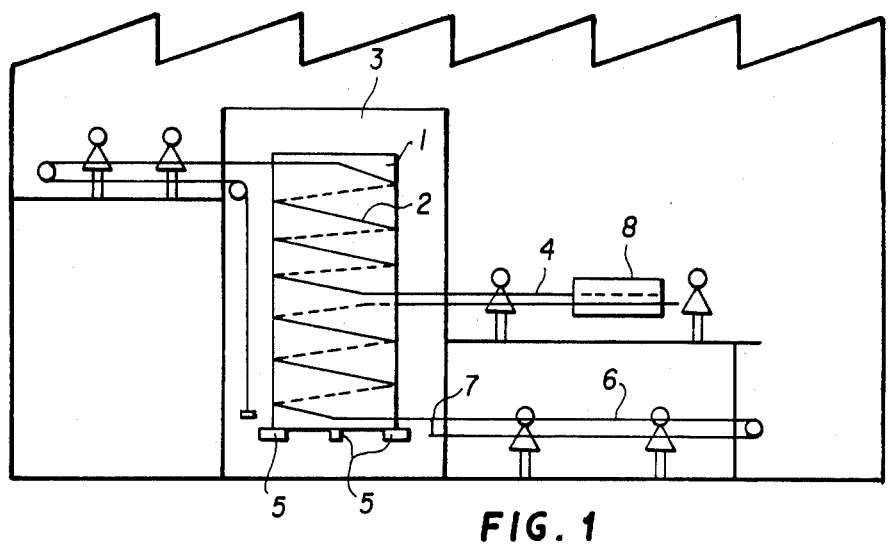
FIG. 1 is a side elevational view of a frezer which can be used to carry out the method of this invention.
Figure 2:
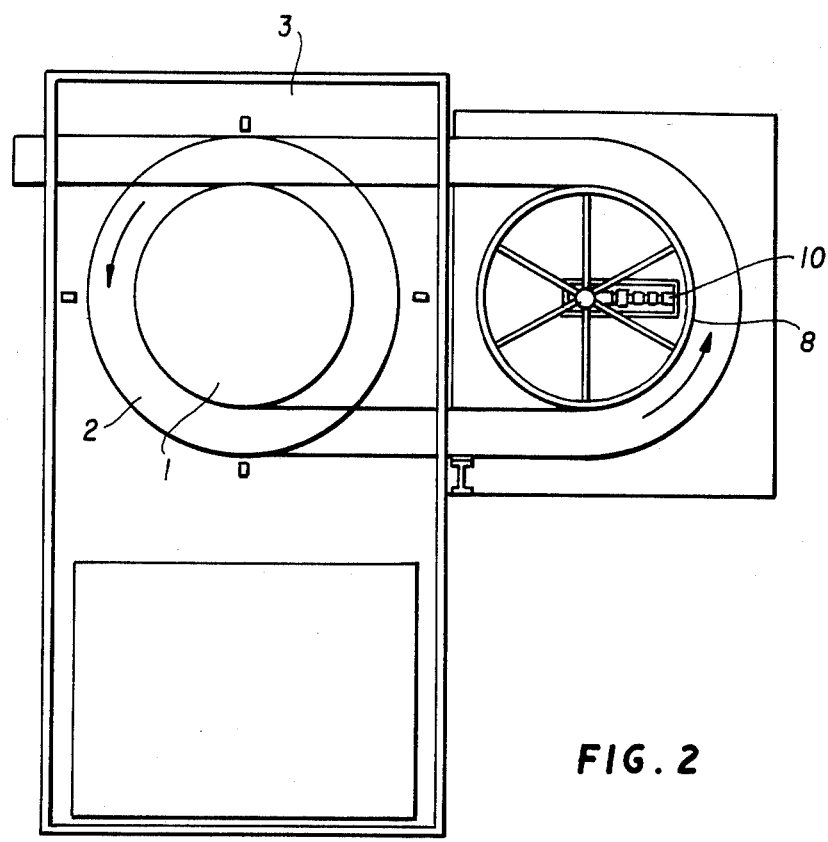
FIG. 2 is a top plan view thereof.

Referring to FIGS. 1 and 2, there is shown a freezer which can appropriately be used for carrying out the method of this invention. It is an improved gyrofreezer. It comprises a drum 1 and an endless chain belt 2 wound spirally about the drum 1. The belt 2 includes an intermediate portion 4 extending outwardly of a cooling chamber 3 intermediate the ends of the drum 1. The intermediate or final processing of the frozen food is performed in the intermediate portion 4 of the belt 2.

The drum 1 is vertically mounted and supported rotatably on a plurality of rollers 5 disposed on a base. The drum 1 has a toothed inner surface with which a gear meshes to drive the drum 1 into rotation. The chain belt 2 is longitudinally expandible and flexible. It extends outwardly of the cooling chamber 3 at three portions located at the top, middle and bottom, respectively, of the drum 1. At the bottom of the drum 1, the belt 2 defines a primary processing line for the food to be frozen. The cream for cream croquettes is, for example, formed into a short columnar shape in the primary processing line 6. The belt 2 conveys the food to be frozen from the primary processing line 6 into the cooling chamber 3 through its inlet 7. The intermediate portion 4 of the belt 2 leaving the cooling chamber 3 at the middle of the drum 1 extends about a small drum 8 and returns to the drum 1, as shown in FIG. 2. It forms an intermediate or final processing line in which the frozen cream for croquettes is, for example, coated. The intermediate portion 4 is so located that the food may leave the cooling chamber 3 after it has been cooled to an appropriate temperature in the range between about 0° C. and about −5° C. The belt 2 defines a line 9 for the inspection and delivery of the frozen food at the top of the drum 1 and then returns to the primary processing line 6. The small drum 8 is driven by a motor 10. The rotating speed of the motor 10 is equal to that of the drum 1 so that the peripheral speed of the drum 8 may coincide with that of the drum 1. Each opening in the wall of the cooling chamber 3 through which the belt 2 extends is provided with a cover which prevents the escape of cold air from the cooling chamber 3, though not shown.

Figure 3:
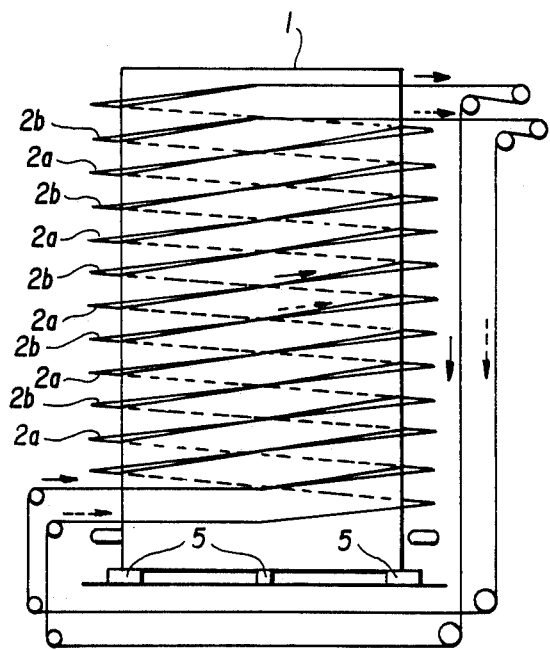
FIG. 3 is a side elevational view of a conventional freezer.

Although the invention has been described with reference to a preferred embodiment thereof, it is to be understood that modifications or variations may be easily made by anybody of ordinary skill in the art without departing from the scope of this invention which is defined by the appended claims. For example, the use of a freezer having two chain belts as in the apparatus shown in FIG. 3 is effective for the simultaneous production of two kinds of frozen food. It is also possible to feed the freezer with the food to be frozen at the top thereof.

The invention will now be described more specifically with reference to a number of examples.

EXAMPLES

The cream of croquettes which had been prepared in a customary way was poured into a tray having a short columnar cavity. The tray was introduced into the cooling chamber 3 of the gyrofreezer shown in FIG. 1 through the inlet 7 and the cream was cooled. The tray was removed from the cooling chamber 3 in the intermediate portion 4 of the belt 2. The cream had a temperature of −4° C. The cream was covered with a croquette coating material on the belt 2 in the intermediate portion 4 thereof. Then, the tray was returned into the cooling chamber 3 and the coated cream was cooled to a temperature of −18° C. to yield a frozen cream croquette.

For control purposes, a frozen cream croquette was produced by the same method except that the cream had a temperature of about 3° C. when it was removed from the cooling chamber in the intermediate portion of the belt.

The two methods, as well as the conventional method, were compared with each other from a number of standpoints including working efficiency and the quality of the product. The results are shown in TABLE 1.

TABLE 1

| | Conventional method (two steps of freezing by a gyrofreezer) | Control method |
| --- | --- | --- |
| Production time (Time required for cream cooling, coating and final freezing) | One day for cream cooling and another day for final freezing. | One day is sufficient for producing substantially the same amount of frozen food (about twice higher productivity). |
| Working efficiency (e.g., separation of frozen cream from tray prior to coating) | A large amount of steam must be blown against the tray, as the cream is completely frozen. As the cream is separated from the tray on the day prior to final freezing, about twice as much labor is required. | The cream is easy to coat, as it is not frozen. The cream has on its surface the traces of the conveyor net and is difficult to handle. |
| Appearance of product (e.g., shape) | The shape is difficult to control, as the batter solution is frozen. | Due to a quick rise in temperature, the cream is soft and loses its proper shape easily. It cannot be transferred from one conveyor to another. |
| Others | The storage of the intermediate products until the following day requires an extra refrigerator space, extra containers and extra energy. The process is difficult to control | It is virtually impossible to employ this method on a practical production basis. |

| | Method of the invention |
| --- | --- |
| Production time | One day is sufficient for producing substantially the same amount of frozen food (about twice higher productivity). |
| Working efficiency | The cream is easy to handle, as it is completely solidified. It is easy to separate from the tray. |
| Appearance of product | Good. |
| Others | The production is carried out at a sufficiently low temperature. There is no need for storage until the following day. Therefore, there is virtually no fear of bacterial contamination. The process is easy to control. |

What is claimed is:

1. In a method for producing a frozen cream food, which comprises at least two freezing steps, the improvement which comprises:
    (a) freezing the cream food at a temperature in the range of 0° to −5° C., at which the maximum crystallization of ice occurs;
    (b) subjecting the frozen cream food to a coating, heating or frying operation to form a processed food;
    (c) freezing the processed food at a temperature of not higher than −10° C.

2. The method as set forth in claim 1, wherein at least one of said freezing steps is carried out by using an apparatus selected from the group consisting of a gyro-freezer and a tunnel freezer.

3. The method as set forth in claim 1, wherein said food is a cream croquette, and said frozen cream food is subjected to a coating operation.

4. The method as set forth in claim 1, wherein said first-mentioned temperature is in the range of between −3° C. to −5° C., while said last-mentioned temperature is not higher than −18° C.

* * * * *